(12) United States Patent
Wang et al.

(10) Patent No.: US 12,641,324 B2
(45) Date of Patent: May 26, 2026

(54) SYSTEM AND METHOD FOR AUTOMATICALLY CAPTURING AND REPLAYING IMAGES, AND NON-TRANSITORY COMPUTER READABLE STORAGE MEDIUM

(71) Applicant: National Cheng Kung University, Tainan City (TW)

(72) Inventors: Jeen-Shing Wang, Tainan City (TW); Wei-Chun Chiang, Tainan City (TW); Shih-Chuan Huang, Taipei City (TW)

(73) Assignee: NATIONAL CHENG KUNG UNIVERSITY, Tainan City (TW)

( * ) Notice: Subject to any disclaimer, the term of this patent is extended or adjusted under 35 U.S.C. 154(b) by 0 days.

(21) Appl. No.: 18/955,013

(22) Filed: Nov. 21, 2024

(65) Prior Publication Data

US 2025/0175682 A1      May 29, 2025

(30) Foreign Application Priority Data

Nov. 23, 2023    (TW) ................................. 112145387

(51) Int. Cl.
| | |
|---|---|
| *H04N 21/85* | (2011.01) |
| *G06F 3/01* | (2006.01) |
| *G06T 7/246* | (2017.01) |
| *G06V 10/12* | (2022.01) |
| (Continued) | |

(52) U.S. Cl.
CPC ............. *H04N 21/85* (2013.01); *G06F 3/017* (2013.01); *G06T 7/246* (2017.01); *G06V 10/12*

(2022.01); *G06V 10/82* (2022.01); *G06V 20/42* (2022.01); *G06T 2207/10016* (2013.01)

(58) Field of Classification Search
CPC ......... H04N 21/85; G06F 3/017; G06T 7/246; G06T 2207/10016; G06V 10/12; G06V 10/82; G06V 20/42; G06V 40/23
See application file for complete search history.

(56) References Cited

U.S. PATENT DOCUMENTS

| | | | | |
|---|---|---|---|---|
| 12,434,103 B2 * | 10/2025 | McCants | ............ | A63B 24/0075 |
| 2019/0388728 A1 * | 12/2019 | Wang | ....................... | G06F 18/29 |

(Continued)

FOREIGN PATENT DOCUMENTS

| | | |
|---|---|---|
| TW | 201509487 A | 3/2015 |
| TW | 202207182 A | 2/2022 |

*Primary Examiner* — Shadan E Haghani
(74) *Attorney, Agent, or Firm* — MUNCY, GEISSLER, OLDS & LOWE, P.C.

(57) ABSTRACT

A system and method for automatically capturing and replaying images. The method is applied to the system to automatically capture and replay an image of a sporting motion. The system includes a signal sensing device installed at a handheld sport equipment for sensing a sporting motion of the player holding the handheld sport equipment so as to output a sensing signal. The method includes steps of: capturing a sporting video of the sporting motion of the player holding the handheld sport equipment by an image capturing device; identifying a strike motion conforming to a specific strike from the sensing signal by an electronic device; automatically extracting a swing image corresponding to the strike motion from the sporting video captured by the image capturing device by the electronic device; and playing the swing image.

14 Claims, 4 Drawing Sheets

(51) Int. Cl.
G06V 10/82            (2022.01)
G06V 20/40            (2022.01)

(56)                    References Cited

U.S. PATENT DOCUMENTS

2023/0153610 A1*   5/2023   Fujimura ............... G06N 3/084
                                                                  706/25
2025/0025765 A1*   1/2025   Chvala ............... A63B 24/0062

* cited by examiner

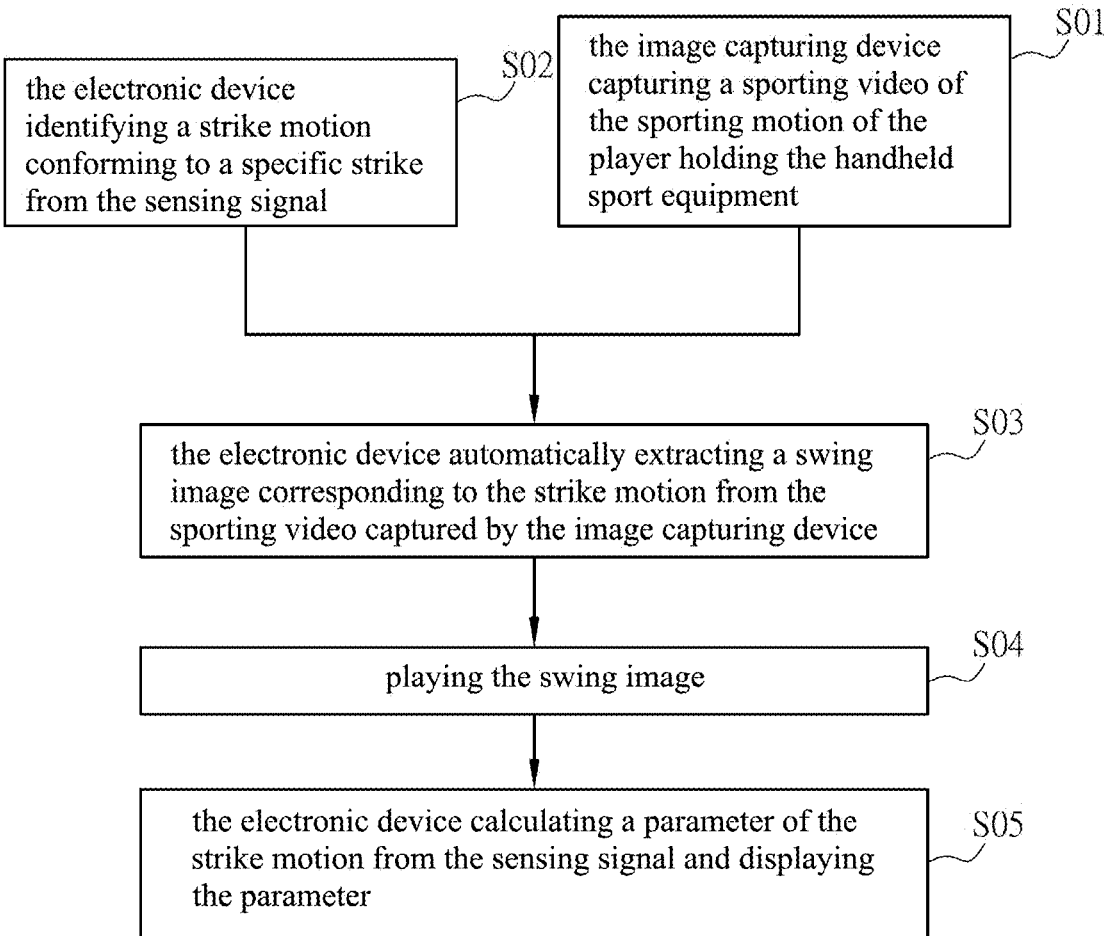

the image capturing device capturing a sporting video of the sporting motion of the player holding the handheld sport equipment ~S01 the electronic device identifying a strike motion conforming to a specific strike from the sensing signal ~S02 the electronic device automatically extracting a swing image corresponding to the strike motion from the sporting video captured by the image capturing device ~S03 playing the swing image ~S04 the electronic device calculating a parameter of the strike motion from the sensing signal and displaying the parameter ~S05

FIG. 4

SYSTEM AND METHOD FOR AUTOMATICALLY CAPTURING AND REPLAYING IMAGES, AND NON-TRANSITORY COMPUTER READABLE STORAGE MEDIUM

CROSS REFERENCE TO RELATED APPLICATIONS

This Non-provisional application claims priority under 35 U.S.C. § 119(a) on Patent Application No(s). 112145387 filed in Taiwan, Republic of China on Nov. 23, 2023, the entire contents of which are hereby incorporated by reference.

BACKGROUND

Technology Field

The present disclosure relates to a system and method for automatically capturing and replaying images.

Description of Related Art

Sports, such as badminton, baseball, table tennis, tennis or golf, etc., have been people's favorites. During the games of these sports, there are always exciting hitting movements, such as the smashes in badminton or the bat swing in baseball. In order for viewers to watch or replay the exciting actions again, it is necessary to use real-time recorded videos or images to replay these exciting motions.

However, the conventional video replays of the exciting motions are manually extracted by the operator after viewing the recorded videos, and then the extracted images are edited before replaying, which is quite inconvenient.

SUMMARY

An objective of this disclosure is to provide a system and method for automatically capturing and replaying images and a non-transitory computer readable storage medium. Unlike the conventional replays of exciting motions that require manual works, this disclosure can automatically identify the player's sporting motions, and automatically capture and play the images of the sporting motions, so that the viewer can easily and conveniently watch or review about the exciting motions.

In addition, this disclosure further allows the player or/and coach to instantly confirm the correctness of exercise postures to avoid injuries. Moreover, this disclosure also allows the player or/and coach to immediately obtain exercise status and perform exercise evaluation.

To achieve the above, this disclosure provides a system for automatically capturing and replaying images, which is applied to automatically capture and replay an image of a sporting motion of a player holding a handheld sport equipment. The system includes a signal sensing device, an image capturing device, and an electronic device. The signal sensing device is installed at the handheld sport equipment for sensing the sporting motion of the player holding the handheld sport equipment so as to output a sensing signal. The image capturing device captures a sporting video of the sporting motion of the player holding the handheld sport equipment. The electronic device is individually coupled to the signal sensing device and the image capturing device, and the electronic device includes one or more processing units and a memory unit. The one or more processing units are coupled to the memory unit, and the memory unit stores one or more instructions. The one or more processing units perform, when executing the one or more instructions, following processes: a first process: identifying a strike motion conforming to a specific strike from the sensing signal; a second process: automatically extracting a swing image corresponding to the strike motion from the sporting video captured by the image capturing device; and a third process: playing the swing image.

To achieve the above, the present disclosure also provides a method for automatically capturing and replaying images, which is applied to a system for automatically capturing and replaying images to automatically capture and replay an image of a sporting motion of a player holding a handheld sport equipment. The system includes a signal sensing device, an image capturing device and an electronic device. The signal sensing device is installed at the handheld sport equipment for sensing the sporting motion of the player holding the handheld sport equipment so as to output a sensing signal, and the electronic device is individually coupled to the signal sensing device and the image capturing device. The method includes the following steps of: the image capturing device capturing a sporting video of the sporting motion of the player holding the handheld sport equipment; the electronic device identifying a strike motion conforming to a specific strike from the sensing signal; the electronic device automatically extracting a swing image corresponding to the strike motion from the sporting video captured by the image capturing device; and playing the swing image.

In one embodiment, the one or more processing units adopts a strike-motion identifying algorism to identify the strike motion from the sensing signal, and the strike-motion identifying algorism includes a motion signal segmentation step, a signal normalization step, a CNN (convolutional neural network) classification step, and a strike-motion identification step.

In one embodiment, the strike motion includes a forehand long serve, a backhand short serve, a forehand high clear, a backhand high clear, a forehand net lift, a backhand net lift, a forehand net shot, a backhand net shot, a forehand drive, a backhand drive, a forehand net block, a backhand net block, a forehand slow drop shot, a forehand high and long shot, a forehand smash, or a forehand push.

In one embodiment, the system further includes a player device coupled to the electronic device, and the swing image is played by the player device.

In one embodiment, the one or more processing units further perform a fourth process: calculating a parameter of the strike motion from the sensing signal and displaying the parameter.

In one embodiment, the electronic device adopts a strike-motion identifying algorism to identify the strike motion from the sensing signal, and the strike-motion identifying algorism includes a motion signal segmentation step, a signal normalization step, a CNN classification step, and a strike-motion identification step.

In one embodiment, the method further includes: the electronic device calculating a parameter of the strike motion from the sensing signal and displaying the parameter.

To achieve the above, the present disclosure further provides a non-transitory computer readable storage medium storing an application software, and an electronic device loads and executes the application software to perform the above-mentioned method for automatically capturing and replaying images.

As mentioned above, in the system and method for automatically capturing and replaying images of this disclosure, the image capturing device can capture a sporting video of the sporting motion of a player holding a handheld sport equipment, the electronic device can identify a strike motion conforming to a specific strike from the sensing signal, which is obtained by sensing the sporting motion of the player holding the handheld sport equipment, automatically extract a swing image corresponding to the strike motion from the sporting video captured by the image capturing device, and playing the extracted swing image. Therefore, unlike the conventional replays of exciting motions (video segments) that require manual works, the system and method of this disclosure can automatically identify the player's strike motions, and automatically capture and play the swing images corresponding to strike motion conforming to the specific strike, so that the viewer can easily and conveniently watch or review about the exciting moments in the sporting motion. In one application, this disclosure can further allow the player or/and coach to instantly confirm the correctness of exercise postures to avoid injuries. In one application, this disclosure can also allow the player or/and coach to immediately obtain exercise status and perform exercise evaluation.

BRIEF DESCRIPTION OF THE DRAWINGS

The disclosure will become more fully understood from the detailed description and accompanying drawings, which are given for illustration only, and thus are not limitative of the present disclosure, and wherein:

FIG. 4 is a flow chart of a method automatically capturing and replaying images according to an embodiment of this disclosure.

DETAILED DESCRIPTION OF THE DISCLOSURE

The present disclosure will be apparent from the following detailed description, which proceeds with reference to the accompanying drawings, wherein the same references relate to the same elements.

Figure 1A:
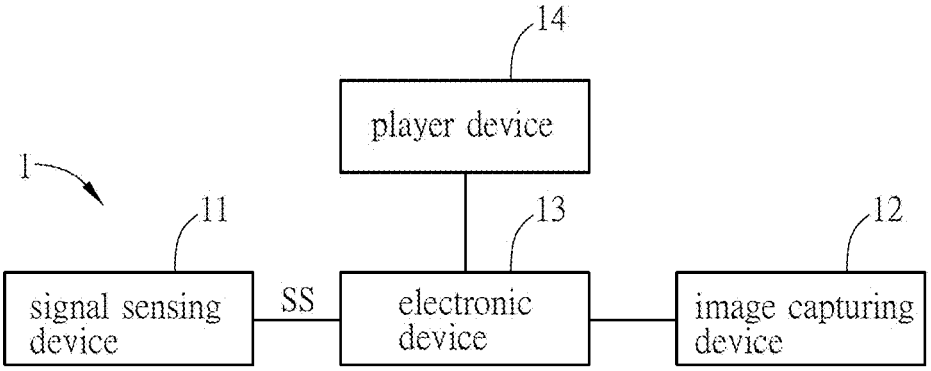
FIG. 1A is a schematic block diagram showing a system for automatically capturing and replaying images according to an embodiment of this disclosure.
Figure 1B:
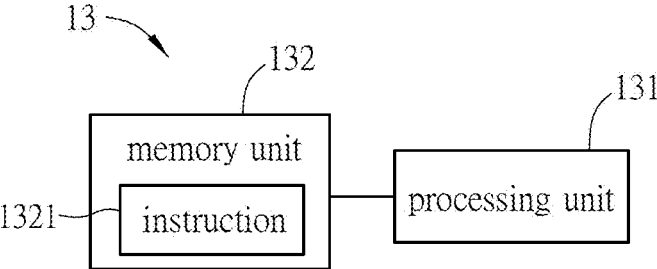
FIG. 1B is a schematic block diagram showing an electronic device of the system for automatically capturing and replaying images of FIG. 1A.
Figures 2A, 2B:
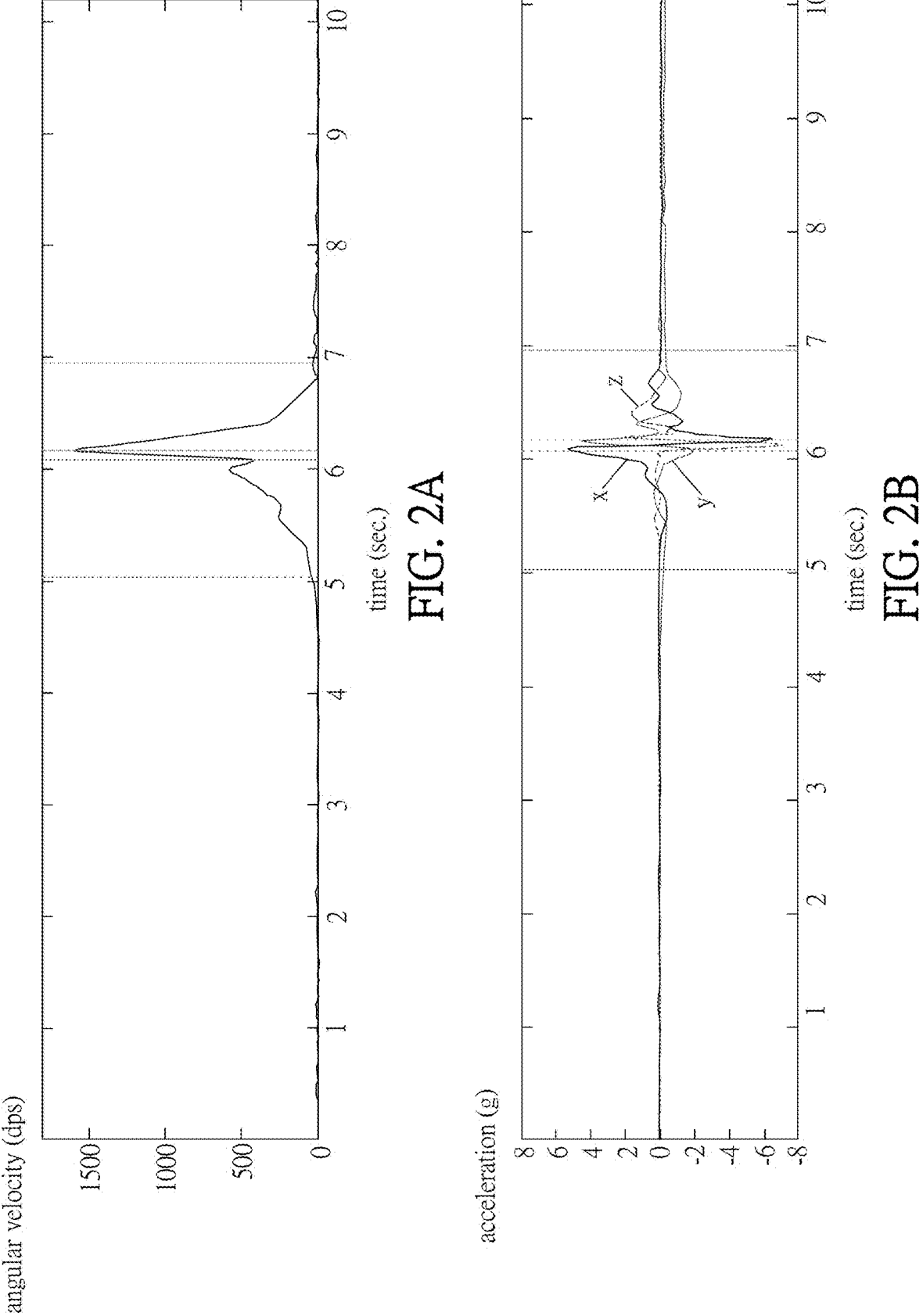
FIGS. 2A and 2B are schematic diagrams showing the signals of angular velocity and acceleration obtained by a signal sensing device from a sporting motion of a player holding a handheld sport equipment.
Figure 3:
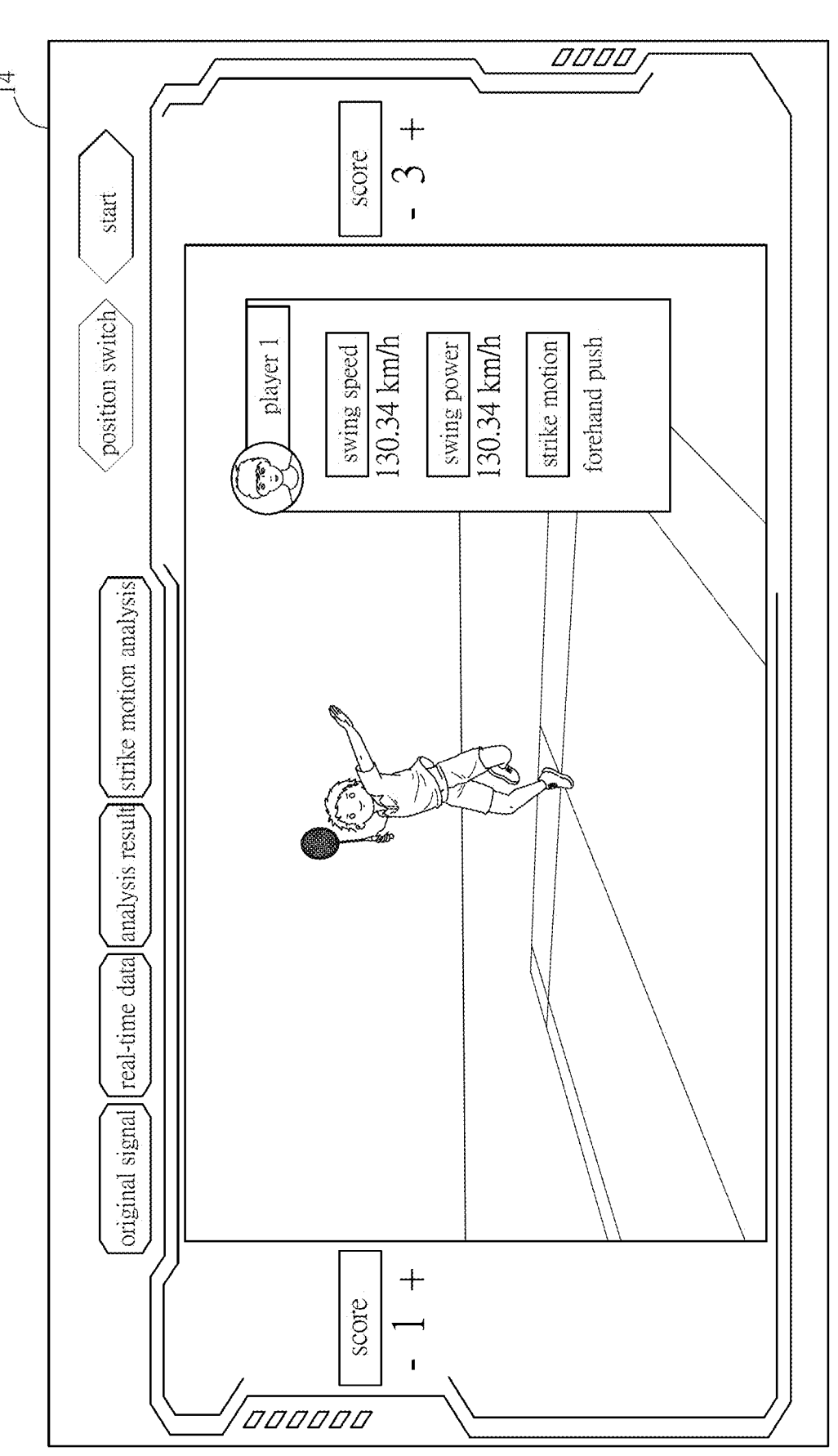
FIG. 3 is a schematic diagram showing a displayed image of a player device of the system for automatically capturing and replaying images according to an embodiment of this disclosure.

FIG. 1A is a schematic block diagram showing a system for automatically capturing and replaying images according to an embodiment of this disclosure, and FIG. 1B is a schematic block diagram showing an electronic device of the system for automatically capturing and replaying images of FIG. 1A. FIGS. 2A and 2B are schematic diagrams showing the signals of angular velocity and acceleration obtained by a signal sensing device from a sporting motion of a player holding a handheld sport equipment. FIG. 3 is a schematic diagram showing a displayed image of a player device of the system for automatically capturing and replaying images according to an embodiment of this disclosure. To be noted, FIGS. 2A and 2B show the waveforms of the sensing signals obtained by sensing the sporting motion of a player holding a handheld sport equipment.

The system 1 for automatically capturing and replaying images of this disclosure can be applied to automatically capture and replay an image of a sporting motion of a player holding a handheld sport equipment. In this embodiment, the sporting motion can be obtained from the sport such as, for example but not limited to, badminton, baseball, table tennis, tennis or golf, or any of other sports that use handheld sport equipment. The above-mentioned handheld sport equipment may be a badminton racket, a baseball bat, a tennis racket, a table tennis racket, a golf club, or any of other equipment for swinging or hitting. The handheld sport equipment in the following embodiments takes a badminton racket as an example. Accordingly, the "sporting" motion that appears below is the motion of "swinging or striking a badminton racket". In another case, if the system and method are applied to baseball or golf, the sporting motion is the motion of swinging a baseball bat or a golf club. In addition, the "player" that appears below refers to a person who uses a handheld sport equipment to perform the sporting motion.

With reference to FIGS. 1A and 1B, the system 1 for automatically capturing and replaying images includes a signal sensing device 11, an image capturing device 12, and an electronic device 13. In addition, the system 1 of this embodiment can further include a player device 14.

The signal sensing device 11 is installed in the handheld sport equipment. The signal sensing device 11 can sense the sporting motion (e.g. smash or slow drop shot) of a player holding the handheld sport equipment (e.g. a badminton racket), and outputs a sensing signal SS accordingly. The signal sensing device 11 can be disposed at, for example but not limited to, the handle of the handheld sport equipment (e.g. a badminton racket, a baseball bat, a tennis racket or a table tennis racket) or a club head of the handheld sport equipment (e.g. a golf club). Taking a badminton racket as an example, the signal sensing device 11 can be installed inside the handle of the badminton racket, or in the handle end cap of the badminton racket. To be noted, this disclosure is not limited thereto. In different embodiments, the signal sensing device 11 can be installed at any of other parts of the handheld sport equipment, and this disclosure is not limited thereto. In the following embodiments, the signal sensing device 11 is installed inside, for example, the handle of a badminton racket. Therefore, when the player holds the badminton racket and swings it, the signal sensing device 11 can sense the player's sporting (swinging) motion and output a sensing signal SS corresponding to the sporting (swinging) motion. In general, when the entire sporting motion in a period of time may include a plurality of strikes (swings), the output signal is also called a sensing signal SS.

In this embodiment, the signal sensing device 11 may include an inertial sensor, such as, for example but not limited to, a three-axis accelerometer, a three-axis gyroscope, or a three-axis magnetometer, which can obtain the accurate sporting motion (swinging motions). Therefore, the sensing signal SS is an inertial sensing signal, which may include the acceleration signal, angular velocity signal and magnetic signal during the sporting motion. In one embodiment, a nine-axis inertial sensor, which includes a six-axis sensor (e.g. ICM-20649, TDK InvenSense) and a three-axis magnetometer (e.g. LIS2MDL, digital magnetic sensor) composed of accelerometers and gyroscopes, can be used. In general, the accelerometer is used to sense the acceleration caused by the gravity and movement, the gyroscope is used to sense the angular velocity generated by the movement, and the magnetometer is used to sense the earth magnetic field vector and calculate to obtain azimuth information.

In one embodiment, the signal sensing device 11 may further include a microcontroller unit and a power supply unit. The microcontroller unit can capture and collect the sensing signal SS generated by the inertial sensors (accelerometer, gyroscope and magnetometer) due to the sporting motion and process the sensing signal SS (e.g. temporary storing and encoding). The processed sensing signal SS can be wirelessly transmitted to the electronic device 13 through, for example, a Wi-Fi module or a Bluetooth module in a batch manner, and the electronic device 13 can then perform analysis of the sporting motion and strike motion. The power supply unit can be, for example, a lithium battery, which can provide the power required for the operation of the signal sensing device 11.

The image capturing device 12 can capture the images of a player holding a handheld sport equipment and making a sporting motion. In this case, when the player holds the handheld sport equipment and swings it, since the image capturing device 12 can capture every swing motion, an entire sporting motion contains one or more swing images and the corresponding signal waveform. In one embodiment, at least one image capturing device 12 (e.g. a high-speed camera) can be set up on the sport court to capture images of the player's sporting motion. In one embodiment, multiple image capturing devices 12 can be installed at different positions to capture the sporting motion at different orientations or angles. The number of the image capturing devices 12 and their positions are not limited in this disclosure as long as the image of the player's sporting motion can be clearly captured.

The electronic device 13 is individually coupled to the signal sensing device 11 and the image capturing device(s) 12. The electronic device 13 can be a computer, a server or a cloud device (e.g. a remote server). In one embodiment, the electronic device 13 and the signal sensing device 11 may be electrically coupled by wireless connection, so that the electronic device 13 can receive the sensing signal SS from the signal sensing device 11 before further storing and processing it. In one embodiment, the electronic device 13 and the image capturing device 12 may be electrically coupled by wired or wireless connection for processing (e.g. capturing) images of the sporting motion. The above-mentioned wireless connection may be carried out by, for example, a Wi-Fi module or a Bluetooth module.

In this embodiment, the electronic device 13 may include one or more processing units 131 and a memory unit 132, and the one or more processing units 131 are coupled to the memory unit 132. For example, the electronic device 13 as shown in FIG. 1B includes, for example, one processing unit 131 and one memory unit 132. The processing unit 131 can access the data stored in the memory unit 132, and may include the core control components of the electronic device 13, such as a central processing unit (CPU) and a memory, or may include other control hardware, software or firmware. When the sensing signal SS generated by the signal sensing device 11 after sensing the player's sporting motion is transmitted to the electronic device 13, and it can be stored in the memory unit 132 and be processed and analyzed by the processing unit 131 later. The memory unit 132 can be a non-transitory computer readable storage medium, which may at least include, for example but not limited to, a memory unit, a memory card, an optical disc, a video tape, a computer tape, or any combination thereof. In one embodiment, the aforementioned memory unit may include a read-only memory (ROM), a flash memory, a FPGA (Field-Programmable Gate Array), or an SSD (Solid State Disk), or any other kinds of memory, or a combination thereof.

In addition, the memory unit 132 may store at least one application software, and the application software may include one or more instructions 1321. When the one or more instructions 1321 of the application software are executed by the one or more processing units 131, the one or more processing units 131 at least perform the following first to third processes. In this embodiment, the first process is to identify a strike motion conforming to a specific strike from the sensing signal SS, the second process is to automatically extract a swing image corresponding to the strike motion from the sporting video captured by the image capturing device 12, and the third process is to play the swing image. The technical contents of the first to third processes will be described hereinafter.

To be noted, before the first process, in order to make the subsequent analysis and processing of the sensing signal SS and the generated result more accurate, a signal pre-processing procedure needs to be performed on the inertial signal output by the signal sensing device 11. The signal pre-processing procedure may include a signal correction step and a signal filtering step. In this case, the signal correction step can correct the inertial signal, and the signal filtering step can filter out noises in the inertial signal, so that the subsequent identification results obtained based on the sensing signal SS can be more accurate.

In the first process, since the signal sensing device 11 is installed at the handheld sport equipment, when the player makes a striking motion (swinging motion) with holding the handheld sport equipment, the signal sensing device 11 can output a sensing signal SS corresponding to the striking motion (swinging motion). The waveform of the sensing signal SS can be, for example, as shown in FIG. 2A or FIG. 2B. Therefore, the electronic device 13 (the processing unit 131) can identify, based on the user's (or viewer's) demand for a specific strike, a strike motion conforming to the specific strike from the sensing signal SS. Then, the electronic device 13 can automatically extract a swing image corresponding to the strike motion from the sporting video captured by the image capturing device 12 (the second process). Finally, the electronic device 13 can play the extracted swing image (the third process).

Specifically, the player may make a sporting motion (including a series of strike motions) for a period of time, the generated sensing signal SS may include many different strike motions, such as smash, drop, drive, net lift, or the likes. Each strike motion (in the sporting motion) corresponds to a type of waveform in the sensing signal SS. Of course, each strike motion will also have its corresponding swing image (video segment) captured and stored by the image capturing device 12. The processing unit 131 can identify the different types of waveforms in the sensing signal SS so as to obtain the strike motions represented by the signal waveforms. For example, if the user (viewer) wants to watch, for example, the "forehand smash", the processing unit 131 can find the signal waveforms corresponding to the "forehand smash" from the sensing signal SS, and automatically extract the swing images (video segments) corresponding to the found signal waveforms corresponding to the "forehand smash", and then play the swing images (video segments).

To achieve the above objective, the electronic device 13 (the processing unit 131) needs to first identify all strike motions in the sporting motion of the player based on the waveform of the sensing signal SS, and then finds the strike motions conformed to the specific strike from all strike motions. In this embodiment, the one or more processing units 131 use a strike-motion identification algorithm to identify the strike motions conforming to the specific strike from the sensing signal SS. The strike-motion identification algorithm may include a motion signal segmentation step, a signal normalization step, a CNN (convolutional neural network) classification step, and a strike-motion identification step.

In the motion signal segmentation step, there will be generally a static period before and after one swing motion. In the static period, because the signal sensing device 11 is at a stop state, the three-axis net forces of the accelerometer and gyroscope are all equal to zero. Therefore, a dynamic threshold can be set to detecting the period of the swing motion. For example, a standard score (z-score), which is calculated based on the first 200 sampling points of the sensing signal, can be used as the dynamic threshold for correctly segmenting the signal corresponding to the swing motion.

After the inertial sensing signal generated based on the sporting motion (swing motion) has been processed by the signal correction step, the signal filtering step and the motion signal segmentation step, the signal normalization step can be performed to normalize the sensing signal SS.

The CNN classification step and the strike-motion identification step are discussed as below. In the sensing signal SS after processed by the signal normalization step, the three-axis angular velocity signal in each swing motion signal can be used as an input to a CNN classifier so as to identify the strike motion from the sensing signal SS. In this embodiment, the strike motion may be, for example, selected from one of the following sixteen strike motions including a forehand long serve, a backhand short serve, a forehand high clear, a backhand high clear, a forehand net lift, a backhand net lift, a forehand net shot, a backhand net shot, a forehand drive, a backhand drive, a forehand net block, a backhand net block, a forehand slow drop shot, a forehand high and long shot, a forehand smash, and a forehand push. The architecture of the CNN classifier may include two convolutional layers, two pooling layers, a fully connected layer and an output layer, which will be described in detail as follow.

Regarding the convolution layer, each convolution layer contains multiple convolution kernels. First, by setting the convolution kernel size and using the convolution principle, the window is stridden and the values in each area are weighted. Then, the output of the convolution layer is calculated through the activation function, thereby extracting important information from the input signal. In this case, 128 1×5 convolutional kernels/filters are set for each convolutional layer to extract the image features.

$$c_i^{l,k} = ReLU\left(b_k^l + \sum_{m=1}^{M} w_m^{l,k} x_{i+m-1}^{l-1,k}\right)$$

Wherein, $$\chi_i^0 = [\chi_1, \chi_2, \dots, \chi_N]$$

is the input vector composed of the three-axis angular velocity signal; i is the data point index in each strike; N is the number of data points in each strike; l is the index of the layer; M is the convolution kernel/filter size;

$$b_k^l$$

is the partial weight of the kth feature map of the lth layer;

$$w_m^{l,k}$$

is the connection weight between the input, $$x_{i+m-1}^{l-1,k}$$

and the kth feature map of the lth layer; and ReLU is the rectified linear activation function.

The pooling layer mainly uses the output of the convolution layer as its input and performs downsampling. In this case, the max pooling operation is used to reduce the dimension of the feature map (network training parameters) and only retain the important features in the input image. The pooling size is 1×2, and the stride is 2. Wherein, R is the pooling size, and T is the stride of the pooling.

$$p_i^{l,k} + \max_{r \in R}\left(c_{i \times T + r}^{l,k}\right)$$

The fully connected layer is used to flatten the features obtained after multiple convolution layers and pooling layers into a feature vector $p^l = p_1, p_2, \dots, p_g$ as the input thereof. Wherein, g is the number of neurons in the last pooling layer. The fully connected layer performs the following operation:

$$f_h^l = ReLU\left(\sum_g w_{hg}^l\left(p_g^{l-1}\right) + b_h^l\right)$$

Wherein, $$w_{hg}^l$$

is the connection weight value between the gth neuron of the (l−1)th layer in the fully connected layer and the hth neuron of the lth layer in the fully connected layer;

$$b_h^l$$

is the partial weight of the hth neuron of the lth layer in the fully-connected layer; ReLU is the rectified linear activation function. Finally, $$f_h^l = [f_1, f_2, \dots, f_h]$$

is the depth feature obtained by the CNN operation.

The output layer is usually based on a classifier. In this case, the Softmax classifier is used. The Softmax classifier is based on the log-sigmoid function. The X-axis ranges from positive infinity to negative infinity, and the Y-axis ranges from 0 to 1. By mapping the output of the fully connected layer to the [0,1] region, the obtained value can be converted into the corresponding probability, and the maximum value is taken as the classification result.

Since the strike motions of each sporting motion have been identified according to the sensing signal SS by using the strike-motion identification algorithm, the electronic device 13 (the processing unit 131) can find a strike motion conforming to a specific strike that the user (viewer, such as the player, coach, or others) interests from all strike motions. Then, the swing image corresponding to the strike motion can be automatically extracted from the sporting video captured by the image capturing device 12 (the second process). For example, if the viewer wants to watch the exciting motions of the player about smashing, the electronic device 13 (processing unit 131) can find the swing images (video segments) corresponding to the strike motions (smashing) made by the player, and then play the found or extracted swing images in the third process.

Referring to FIG. 1A again, the player device 14 is coupled to the electronic device 13, and the electronic device 13 can play the extracted swing images by the player device 14. In this embodiment, the player device 14 and the electronic device 13 may be electrically coupled by wired or wireless connection. In one embodiment, the player device 14 may be, for example but not limited to, an image playing computer or a video player. Therefore, the swing image (video segment) that conforms to the specific strike can be played by the player device 14 (the third process) and displayed to the user (viewer). In one embodiment, if there are two or more swing images (video segments) conforming to the specific strike in the sporting video, the swing images (video segments) can be played sequentially.

In practice, to avoid missing exciting scenes, the electronic device 13 may also extract the extra video segments of, for example, 0.5 seconds before and after the extracted swing image. For example, if the extracted swing image (video segment) starts at 3 minutes and 25 seconds and ends at 3 minutes and 26.5 seconds in the sporting video, the finally extracted and played swing image can start at 3 minutes and 24.5 seconds and end at 3 minutes and 27 seconds in the sporting video.

In addition to the above-mentioned first to third processes, the one or more processing units 131 can further perform a fourth process to calculate a parameter of the strike motion from the sensing signal SS and displaying the parameter. For example, as shown in FIG. 3, the player device 14 can play the extracted swing image conforming to the specific strike, and further display some important parameters of the corresponding strike motion, such as the swing speed, the swing power, and the type of this strike motion. To be noted, the parameters displayed by the player device 14 are not limited thereto.

FIG. 4 is a flow chart of a method automatically capturing and replaying images according to an embodiment of this disclosure.

This disclosure also provides a method for automatically capturing and replaying images, which is applied to the above-mentioned system 1 to automatically capture and replay an image of a sporting motion of a player holding a handheld sport equipment. The component configurations and functions of the system 1 can be referred to the above embodiment, so the detailed description thereof will be omitted. As shown in FIG. 4, the method for automatically capturing and replaying images of this embodiment includes steps S01 to S05. To be noted, the steps S01 to S05 can be implemented by software, hardware or firmware, or any combination thereof, and this disclosure is not limited thereto.

In the step S01, the image capturing device is used to capturing a sporting video of the sporting motion of the player holding the handheld sport equipment. In the step S02, the electronic device identifies a strike motion conforming to a specific strike from the sensing signal. In the step S03, the electronic device automatically extracts a swing image corresponding to the strike motion from the sporting video captured by the image capturing device. The step S04 is to play the swing image. In the step S05, the electronic device calculates a parameter of the strike motion from the sensing signal and displays the parameter. In practice, the step S01 and the step S02 can be performed separately or simultaneously.

The technical contents of the steps S01 to S05 of the method for automatically capturing and replaying images can be referred to the above-mentioned system 1, so the detailed descriptions thereof will be omitted.

Moreover, the present disclosure further provides a non-transitory computer readable storage medium storing an application software, and a device may load and execute the application software to perform the above-mentioned method for automatically capturing and replaying images. In this embodiment, the device can be any type electronic device, such as a computer, a server or a mobile electronic device. In one embodiment, the storage medium may be a non-transitory computer-readable storage medium, which may at least include, for example, a memory unit, a memory card, an optical disc, a video tape, a computer tape, or any combination thereof. The memory unit may include read-only memory (ROM), flash memory, field-programmable gate array (FPGA), or solid-state disk (SSD), or other forms of memory unit, or a combination thereof. In one embodiment, the storage medium can be a built-in memory of a computer or a server. In one embodiment, the storage medium can be a cloud memory located in a cloud device. In this case, the application software can be stored in the cloud device, and then the electronic device can download the application software from the cloud device and execute it to implement the method for automatically capturing and replaying images.

As mentioned above, unlike the conventional replays of exciting motions (video segments) that require manual works, the system and method for automatically capturing and replaying images of this disclosure can automatically identify the player's strike motions, and automatically capture and play the swing images corresponding to strike motion conforming to the specific strike, so that the viewer can easily and conveniently watch or review about the exciting moments in the sporting motion. In one application, this disclosure can further allow the player and/or coach to instantly confirm the correctness of exercise postures to avoid injuries. In one application, this disclosure can also allow the player and/or coach to immediately obtain exercise status and perform exercise evaluation.

In summary, in the system and method for automatically capturing and replaying images of this disclosure, the image capturing device can capture a sporting video of the sporting motion of a player holding a handheld sport equipment, the electronic device can identify a strike motion conforming to a specific strike from the sensing signal, which is obtained by sensing the sporting motion of the player holding the handheld sport equipment, automatically extract a swing image corresponding to the strike motion from the sporting video captured by the image capturing device, and playing the extracted swing image. Therefore, unlike the conventional replays of exciting motions (video segments) that require manual works, the system and method of this disclosure can automatically identify the player's strike motions, and automatically capture and play the swing images corresponding to strike motion conforming to the specific strike, so that the viewer can easily and conveniently watch or review about the exciting moments in the sporting motion. In one application, this disclosure can further allow the player or/and coach to instantly confirm the correctness of exercise postures to avoid injuries. In one application, this disclosure can also allow the player or/and coach to immediately obtain exercise status and perform exercise evaluation.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A system for automatically capturing and replaying images, which is applied to automatically capture and replay an image of a sporting motion of a player holding a handheld sport equipment, comprising:

an inertial signal sensing device installed at a handle or a club head of the handheld sport equipment for sensing the sporting motion of the player holding the handheld sport equipment so as to output an inertial sensing signal;

an image capturing device capturing a sporting video of the sporting motion of the player holding the handheld sport equipment; and an electronic device individually coupled to the inertial signal sensing device and the image capturing device, wherein the electronic device comprises one or more processing units and a memory unit, the one or more processing units are coupled to the memory unit, the memory unit stores one or more instructions, and the one or more processing units perform, when executing the one or more instructions, following processes:

a first process: identifying a strike motion conforming to a user-specified specific strike from the inertial sensing signal;

a second process: automatically extracting a swing image corresponding to the strike motion conforming to the user-specified specific strike from the sporting video captured by the image capturing device; and a third process: playing the swing image corresponding to the user-specified specific strike.

2. The system of claim 1, the one or more processing units adopts a strike-motion identifying algorism to identify the strike motion from the inertial sensing signal, and the strike-motion identifying algorism comprises a motion signal segmentation step, a signal normalization step, a CNN (convolutional neural network) classification step, and a strike-motion identification step.

3. The system of claim 1, wherein the strike motion comprises a forehand long serve, a backhand short serve, a forehand high clear, a backhand high clear, a forehand net lift, a backhand net lift, a forehand net shot, a backhand net shot, a forehand drive, a backhand drive, a forehand net block, a backhand net block, a forehand slow drop shot, a forehand high and long shot, a forehand smash, or a forehand push.

4. The system of claim 1, further comprising:

a player device coupled to the electronic device, wherein the swing image is played by the player device.

5. The system of claim 1, wherein the one or more processing units further perform:

a fourth process: calculating a parameter of the strike motion from the inertial sensing signal and displaying the parameter.

6. A method for automatically capturing and replaying images, which is applied to a system for automatically capturing and replaying images to automatically capture and replay an image of a sporting motion of a player holding a handheld sport equipment, the system comprising an inertial signal sensing device, an image capturing device and an electronic device, the inertial signal sensing device being installed at a handle or a club head of the handheld sport equipment for sensing the sporting motion of the player holding the handheld sport equipment so as to output an inertial sensing signal, and the electronic device being individually coupled to the inertial signal sensing device and the image capturing device, the method comprising:

the image capturing device capturing a sporting video of the sporting motion of the player holding the handheld sport equipment;

the electronic device identifying a strike motion conforming to a user-specified specific strike from the inertial sensing signal;

the electronic device automatically extracting a swing image corresponding to the strike motion conforming to the user-specified specific strike from the sporting video captured by the image capturing device; and playing the swing image corresponding to the user-specified specific strike.

7. The method of claim 6, wherein the electronic device adopts a strike-motion identifying algorism to identify the strike motion from the inertial sensing signal, and the strike-motion identifying algorism comprises a motion signal segmentation step, a signal normalization step, a CNN classification step, and a strike-motion identification step.

8. The method of claim 6, wherein the strike motion comprises a forehand long serve, a backhand short serve, a forehand high clear, a backhand high clear, a forehand net lift, a backhand net lift, a forehand net shot, a backhand net shot, a forehand drive, a backhand drive, a forehand net block, a backhand net block, a forehand slow drop shot, a forehand high and long shot, a forehand smash, or a forehand push.

9. The method of claim 6, wherein the system further comprises a player device coupled to the electronic device, and the swing image is played by the player device.

10. The method of claim 6, further comprising:

the electronic device calculating a parameter of the strike motion from the inertial sensing signal and displaying the parameter.

11. A non-transitory computer readable storage medium storing an application software, an electronic device loading and executing the application software to perform a method for automatically capturing and replaying images, the method being applied to a system for automatically capturing and replaying images to automatically capture and replay an image of a sporting motion of a player holding a handheld sport equipment, the system comprising an inertial signal sensing device, an image capturing device and the electronic device, the inertial signal sensing device being installed at a handle or a club head of the handheld sport equipment for sensing the sporting motion of the player holding the handheld sport equipment so as to output an inertial sensing signal, the electronic device being individually coupled to the inertial signal sensing device and the image capturing device, and the method comprising:

the image capturing device capturing a sporting video of the sporting motion of the player holding the handheld sport equipment;

the electronic device identifying a strike motion conforming to a user-specified specific strike from the inertial sensing signal;

the electronic device automatically extracting a swing image corresponding to the strike motion conforming to the user-specified specific strike from the sporting video captured by the image capturing device; and playing the swing image corresponding to the user-specified specific strike.

12. The non-transitory computer readable storage medium of claim 11, wherein the electronic device adopts a strike-motion identifying algorism to identify the strike motion from the inertial sensing signal, and the strike-motion identifying algorism comprises a motion signal segmentation step, a signal normalization step, a CNN classification step, and a strike-motion identification step.

13. The non-transitory computer readable storage medium of claim 11, wherein the strike motion comprises a forehand long serve, a backhand short serve, a forehand high clear, a backhand high clear, a forehand net lift, a backhand net lift, a forehand net shot, a backhand net shot, a forehand drive, a backhand drive, a forehand net block, a backhand net block, a forehand slow drop shot, a forehand high and long shot, a forehand smash, or a forehand push.

14. The non-transitory computer readable storage medium of claim 11, wherein the method further comprises:

the electronic device calculating a parameter of the strike motion from the inertial sensing signal and displaying the parameter.

* * * * *